United States Patent [19]

Magee

[11] Patent Number: 4,967,792
[45] Date of Patent: Nov. 6, 1990

[54] SENSING THE OPEN AND/OR CLOSED CONDITION OF VALVES

[76] Inventor: Anthony J. Magee, 1 Curdies Street, East Bentleigh, Victoria 3204, Australia

[21] Appl. No.: 471,683

[22] Filed: Jan. 29, 1990

Related U.S. Application Data

[63] Continuation of Ser. No. 285,345, Dec. 14, 1988, abandoned, which is a continuation of Ser. No. 36,491, Apr. 9, 1987, abandoned, which is a continuation-in-part of Ser. No. 847,655, Jul. 18, 1985, Pat. No. 4,696,325.

[30] Foreign Application Priority Data

Apr. 17, 1986 [AU] Australia ............... PH5507

[51] Int. Cl.⁵ ............................. F16K 37/00
[52] U.S. Cl. ...................... 137/552; 137/554
[58] Field of Search ............. 137/554, 551, 552; 200/81.97

[56] References Cited

U.S. PATENT DOCUMENTS

| | | | |
|---|---|---|---|
| 1,456,149 | 5/1923 | Renshaw. | |
| 2,365,907 | 12/1944 | Rider | 137/551 X |
| 3,522,596 | 8/1970 | Fowler et al. | 137/554 |
| 3,538,948 | 11/1970 | Nelson | 137/554 |
| 3,719,203 | 3/1973 | Wettre | 137/554 |
| 3,859,619 | 1/1975 | Ishihara et al. | 137/554 X |
| 4,093,000 | 6/1978 | Poff | 137/554 |

FOREIGN PATENT DOCUMENTS

| | | |
|---|---|---|
| 549439 | 3/1986 | Australia. |
| 0051961 | 5/1982 | European Pat. Off.. |
| 2146456 | 3/1972 | Fed. Rep. of Germany. |
| 3331013 | 3/1984 | Fed. Rep. of Germany. |
| 1586381 | 2/1970 | France. |
| 500407 | 4/1976 | U.S.S.R.. |
| 1364030 | 8/1974 | United Kingdom. |

*Primary Examiner*—John Rivell
*Attorney, Agent, or Firm*—Whitham & Marhoefer

[57] ABSTRACT

A valve is disclosed which includes a first magnetic sensing means (71) and a closely positioned second magnetic sensing means (73). A valve shaft carries magnetic material (91) which is moved as the valve is opened or closed. The first magnetic sensing means (71) is magnetically held in one of its states when the valve is open, by the presence of the magnetic material (91). When the valve is closed the magnetic material (91) influences the second magnetic sensing means (73) and trips it into an alarm condition. The first magnetic sensing means (71) also trips into an alarm condition when the valve is closed. Thus, there is back-up sensing of the valve being closed. The second magnetic sensing means (73) also acts to provide an alarm if a person should maliciously attempt to fool the sensors by placing magnetic material near the first magnetic sensing means (71) to subsequently close the valve, without causing an alarm. When such magnetic material is brought into proximity of the first magnetic sensing means (71) it will cause the second magnetic sensing means (73) to trip into an alarm state. Sensing means fitted in a housing for attaching to a valve to provide this result is also disclosed.

14 Claims, 6 Drawing Sheets

FIG_1

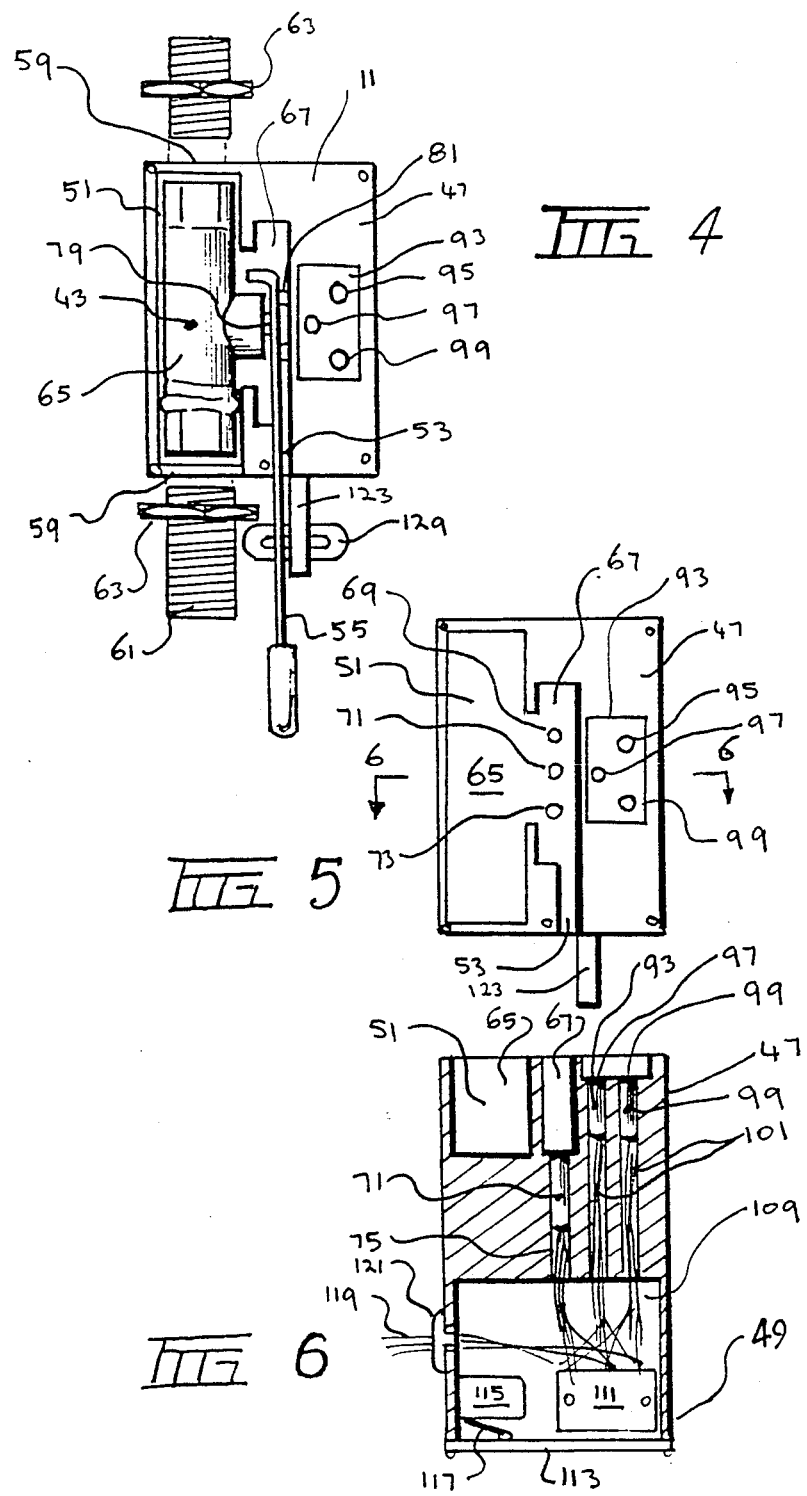

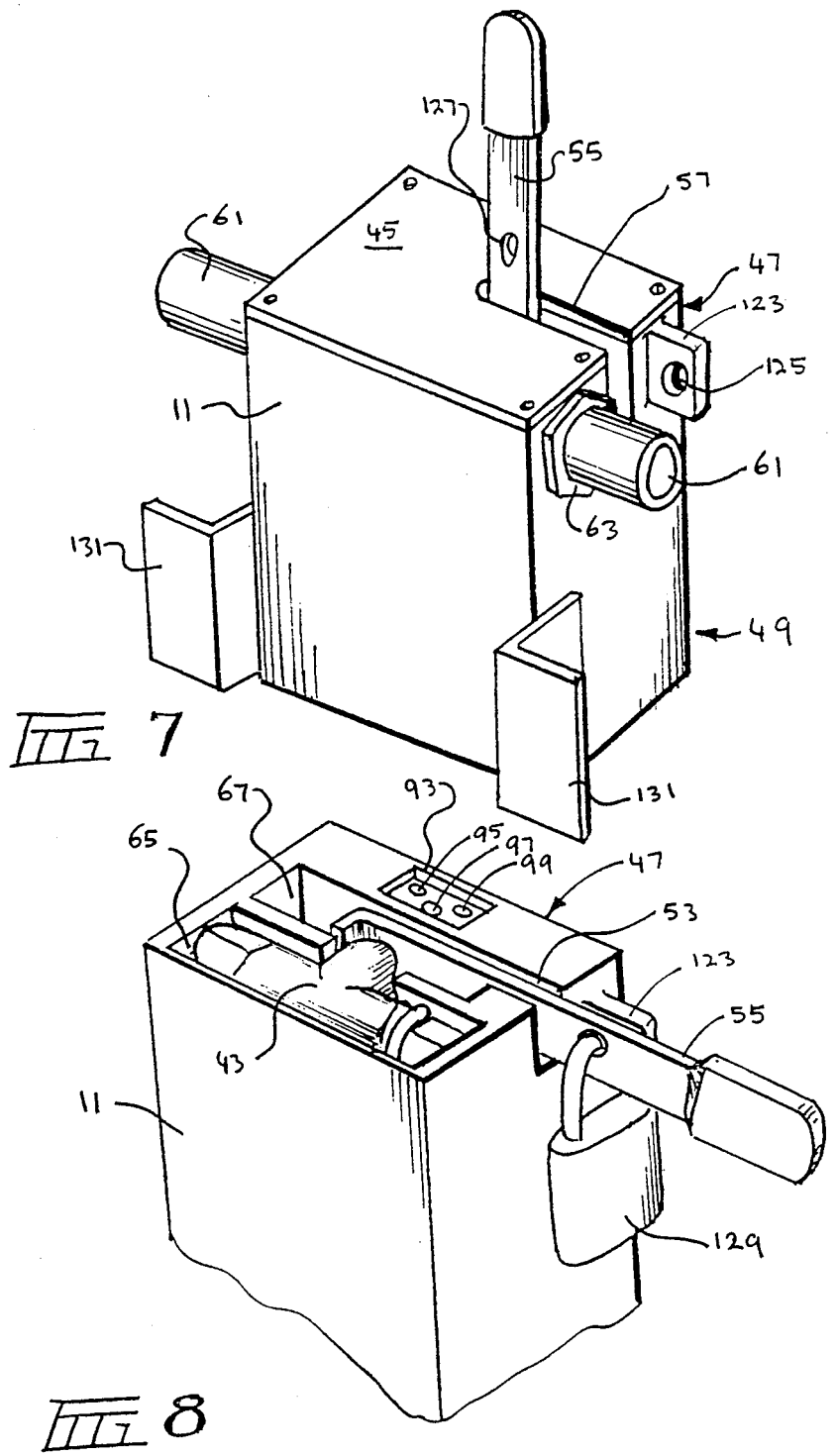

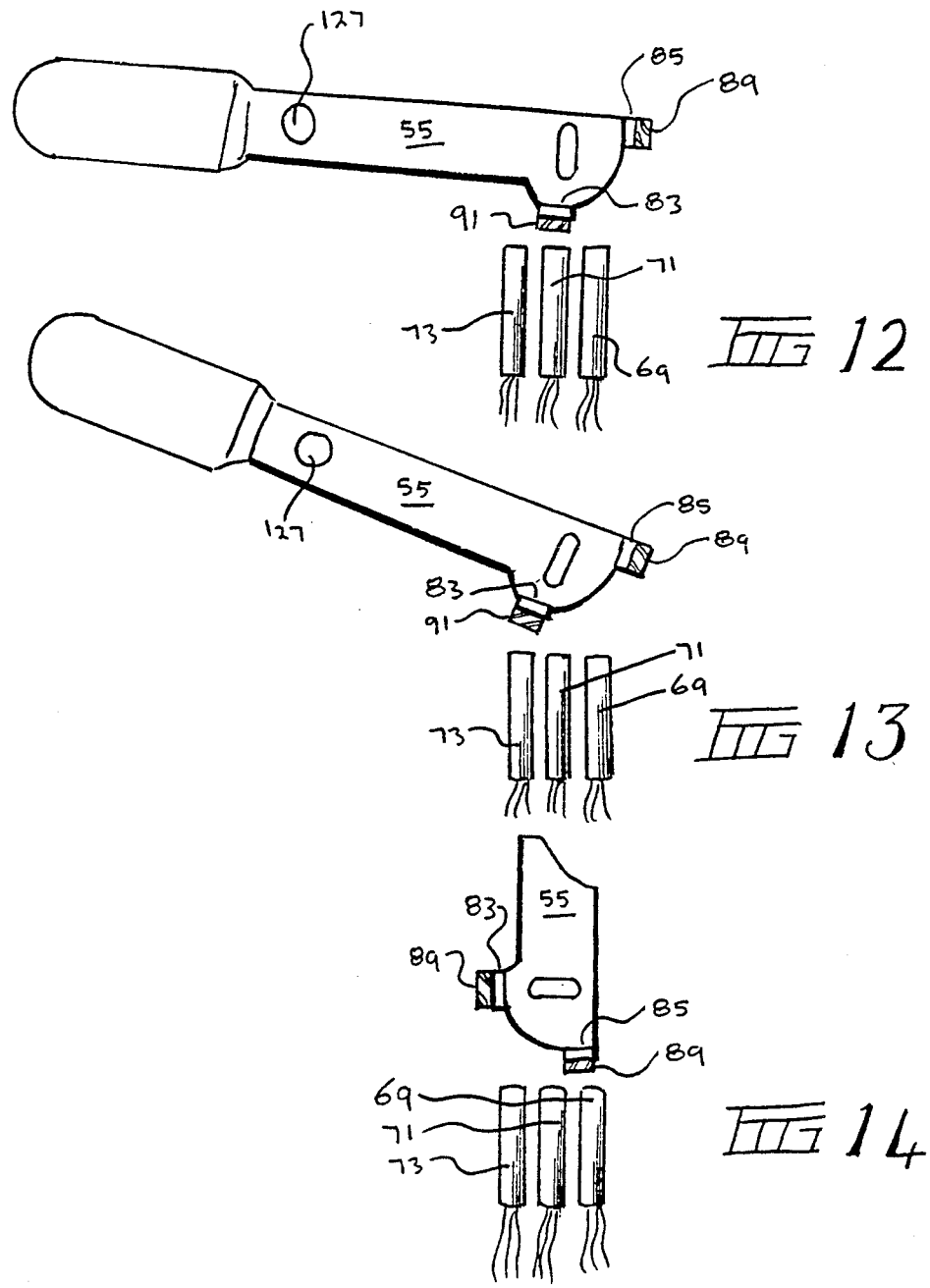

SENSING THE OPEN AND/OR CLOSED CONDITION OF VALVES

FIELD OF THE INVENTION

This application is a continuation of application Ser. No. 07/285,345, filed Dec. 14, 1988, now abandoned, which is a continuation of application Ser. No. 07/036,491, filed Apr. 9, 1987, now abandoned, which is a continuation-in-part of application Ser. No. 847,655, filed July 18, 1985, now U.S. Pat. No. 4,696,325, which corresponds to PCT application PCT/AU85/00156, published as PCT Publication No. WO86/00970.

This invention relates to sensing of the open and/or closed condition of valves and relates particularly but not exclusively to sensing such conditions of fire installation water valves.

DESCRIPTION OF PRIOR ART

In my Australian Petty Patent No. 549,439 there is disclosed sensing means for water supply valves in a fire alarm installation. The sensing means in such valves operates to sense when the valve is closed from the open position. This requirement is considered to be essential in fire alarm installations because if the main water supply valve is closed, then unless some warning can be given to alert personal serious consequences can result if there is a fire.

STATEMENT OF INVENTION

The present invention has been devised to provide an improved valve where better protection can be obtained.

Therefore in accordance with a first broad aspect of the present invention there may be provided a valve for controlling the supply of fluids or other materials, said valve being of the type which is operable to be in a first state where said fluids or other materials can flow therethrough and further operable to be in a second state where said fluids or other materials cannot flow therethrough, said valve having first magnetic sensing means for sensing a magnetic material part of the valve when the valve is in an intended one of its states and for magnetically biasing said first magnetic sensing means into a non-alarm state, and second magnetic sensing means in a non-alarm state positioned adjacent said first magnetic sensing means so as to sense said magnetic material part as said valve is operated to be in a non-intended one of its states, and to then be biased into an alarm state by said magnetic material part.

Most preferably said valve has further magnetic sensing means, positioned at different positions adjacent said magnetic sensing means, whereby to act with said second magnetic sensing means to sense if a person places foreign magnetic material in proximity to said first magnetic sensing means, in attempt to hold said magnetic sensing means in a non-alarm condition. In this manner one or more of the magnetic sensing means will sense the presence of such foreign magnetic material and, in use, will provide an alarm signal.

Most preferably each of said magnetic sensing means is a two state device arranged so that it is biased by said magnetic material to be in one of its states when the valve is in said first state, and so that it can assume its other state when said valve is operated to move to its second state,- i.e. said magnetic material does not bias it to said one state. It is also preferred that said first magnetic sensing means is biased to be in one of its states and wherein the states of the others of said magnetic sensing means are oppositely arranged—i.e. that said magnetic material does not bias them into one of their states until the valve is closed.

It should be appreciated that the second magnetic sensing means provides a backup for the first magnetic sensing means, so that when the valve is moved from its first state to its second state, then if the first magnetic sensing means should not change its state under those conditions due to a failure of the first magnetic sensing means, then the second magnetic sensing means will trip to the other of its states when said magnetic material moves into proximity of the second magnetic sensing means. Accordingly, the second magnetic sensing means provides a backup for the fail safe detection that the valve has moved from its first state towards its second state. Because the second magnetic sensing means is positioned adjacent the first magnetic sensing means, it provides a reliable indication as soon as the valve is moved from its first state towards its second state.

In accordance with a further aspect of the present invention there is provided a first magnetic sensing means and a second magnetic sensing means mounted in a housing adapted to be fitted to a valve, to sense if said valve has been operated to move it from an intended on of its states of operation to a non-intended one of its states of operation, said first magnetic sensing means being held in said housing so that, in use, it will be biased by a magnetic material part of said valve to be in a non-alarm state when said valve is in an intended one of its states, said second magnetic sensing means being held in said housing so that, in use, it will be in a non-alarm state when said valve is in said intended one of its states and so that it will be biased by said magnetic material part to be in an alarm state when said valve is moved to a non-intended one of its states.

BRIEF DESCRIPTION OF THE DRAWINGS

In order that the invention can be more clearly ascertained preferred embodiments will now be described with reference to the accompanying drawings, wherein:

FIG. 4 is a plan view of sensor unit for a different type of valve, modified with preferred sensing means in accordance with the present invention and having its lid removed;

FIG. 5 is a view similar to FIG. 4 but showing the valve and with its operating handle removed;

FIG. 6 is an end view of the sensor unit shown in FIGS. 4 and 5;

FIG. 7 is a perspective view of the sensor unit shown in FIGS. 4, 5 and 6;

FIG. 8 is a perspective view showing the sensor unit of FIGS. 4 through 7 but with the top removed and the handle of the valve locked in a valve open position;

FIGS. 12 through 14 show respective positions of the handle for open, partly closed, and fully closed conditions of the valve.

DETAILED DESCRIPTION OF PREFERRED EMBODIMENT

Figure 1:
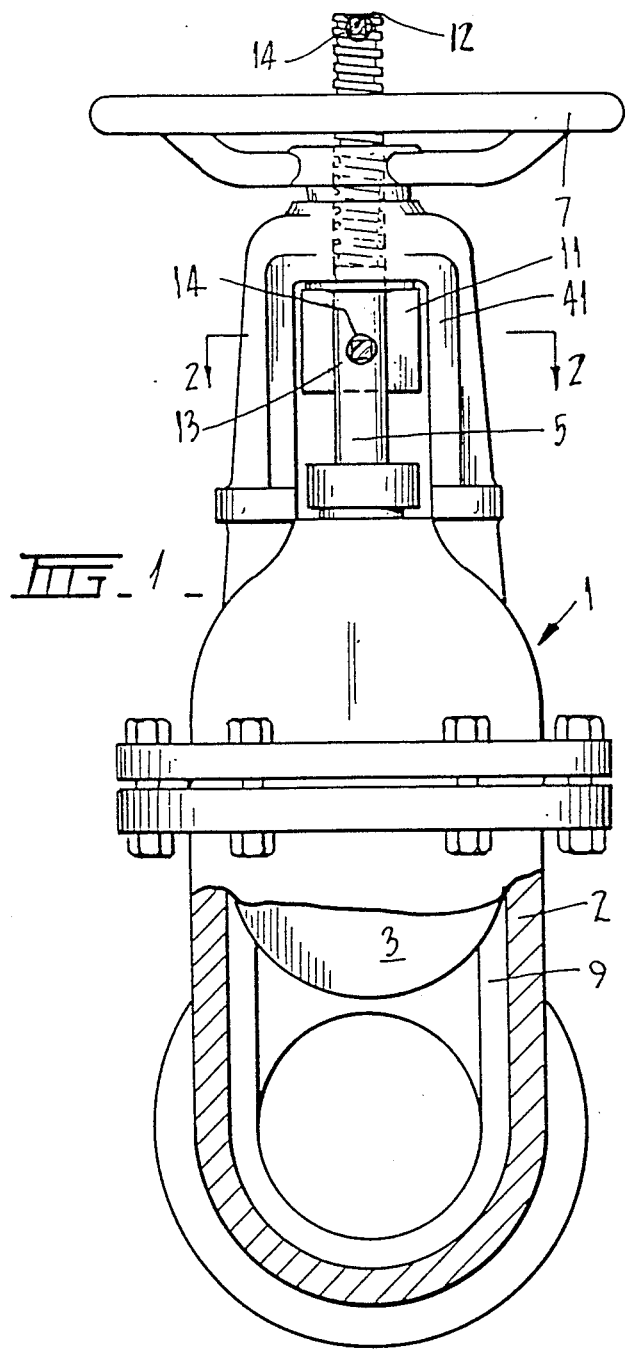
FIG. 1 is a side view of a known gate valve modified in accordance with an embodiment of the present invention.

Referring now to FIG. 1, there is shown a gate valve 1 which has a valve gate 3 therein. The valve gate 3 connects with a threaded valve stem 5 of brass or bronze which, in turn, is operatively connected with a threaded handle 7. Rotation of the handle 7 causes the valve stem 5 to extend or retract to thereby move the gate 3 up or down within guides 9 in the valve body 2 to open and/or close the gate valve. In this embodiment, there is provided a sensor unit 11 which comprises a number of magnetic sensing means in the form of reed switches. These have not been shown in FIG. 1. The sensor unit 11 is fitted to the outside of the valve housing i.e. external of the valve chamber, but at a position where it can sense movement of the valve stem 5. This in turn, is sensing if the gate 3 is open and/or closed.

In order to effect the necessary sensing of the position of the valve stem 5, i.e. if the gate is opened and/or closed, there is provided appropriate magnetic material 12 and 13 fitted within appropriate holes 14 drilled into the valve stem 5. The sensor unit 11 can, in turn, sense the position of either appropriate magnetic material 12 or 13 and thus determine if the valve is open and/or closed. Typically, the appropriate magnetic material 12 and 13 is a permanent magnet but it may comprise ferromagnetic material such as mild steel if the reed switches are of the type which can react by the presence and/or absence of that mild steel. It should be appreciated that reed switches come in two types, i.e. one that is not magnetized and which requires a magnet to cause it to operate, and the other type wherein the reeds are magnetized or at least one of the reeds is magnetized and wherein a further magnet and/or other appropriate magnetic material such as mild steel, can influence the magnetic fields in the reed switch and cause it to operate. All of these types of switches and appropriate magnetic materials are considered to be within the scope of the present invention. Other types of magnetic sensing means are also included such as Hall effect devices and the like which when connected to appropriate circuitry can provide a two state output.

Figure 2:
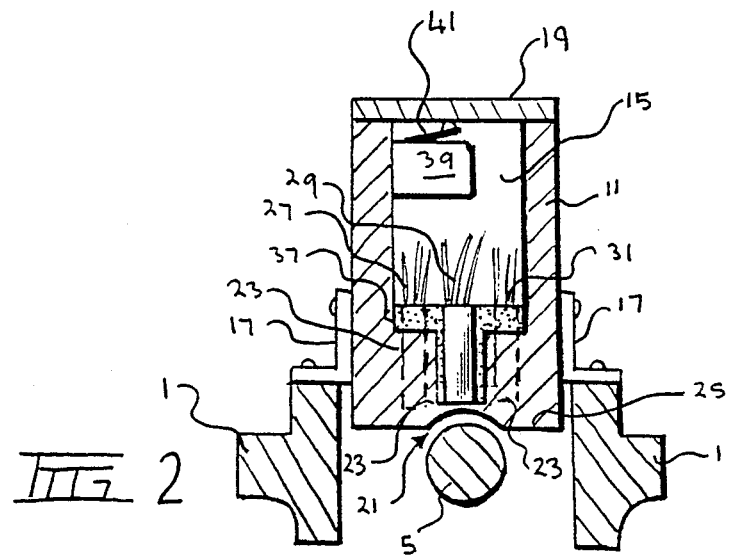
FIG. 2 is a sectional view taken along line 2—2 of FIG. 1 showing the detail of a sensor unit.

Referring now to FIG. 2 there is shown a close-up sectional view of the sensor unit 11 taken along line 2—2 of FIG. 1. The sensor unit 11 comprises a generally rectangular block of bronze material which has a cubic hollow interior 15. The sensor unit 11 is mounted to the valve 1 by means of right angle brackets 17 which connect with an upper yoke part of the valve 1. The sensor unit 11 has a lid 19 which closes the interior 15. The lid 19 is made from bronze material. The end of the sensor unit 11 which is opposite to the lid 19 is provided with a small curved shaped depression 21. This is provided to enable the sensor unit 11 to fit in close proximity to the valve stem 5. The sensor unit 11 has five holes 23 counterbored therein. The holes 23 terminate near the forward end 25 of the sensor unit 11 and at positions where they will be in general proximity to the valve stem 5. The five holes 23 are arranged in a right angle cross configuration so that three holes 23 are in line and transverse to the longitudinal axis of the stem 5 and so that the other two of the holes 23 are in line with the longitudinal axis of the valve stem 5 and in line with the central hole 23. Reed switches 27, 29, 31, 33 and 35 are positioned in each of the respective holes 23. The reed switches are then encapsulated within the holes 23 by a back fill of epoxy resin 37.

Figure 3:
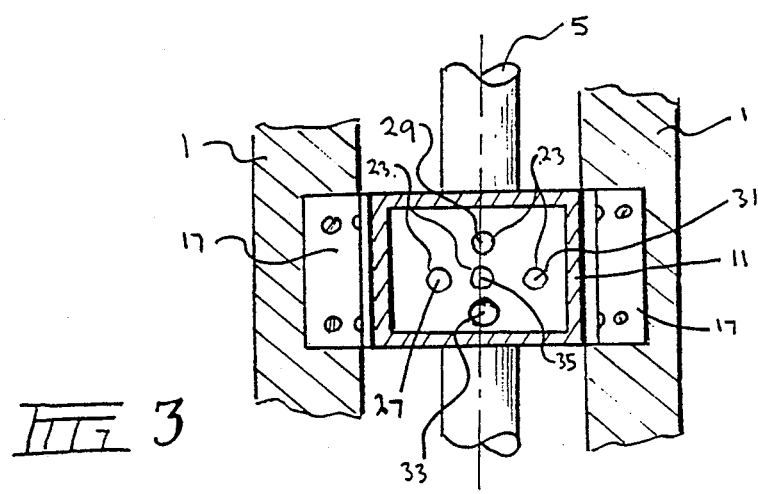
FIG. 3 is an end view of the sensor unit shown in FIG. 2 with its lid removed.

The view shown in FIG. 3 depicts the positions where the respective reed switches 27, 29, 31, 33 and 35 are fitted. Each of those reed switches is of the type which has a common lead, a normally open lead and a normally closed lead. Reed switch 35 is wired so that when the magnet material 13 is directly adjacent the end thereof—i.e. the valve is open—its normally closed contacts are open. The others of the reed switches 27, 29, 31 and 33 are wired so that their normally open contacts are in parallel with the normally closed contacts of the central reed switch 35 i.e. their states are different to that of reed switch 35. In the parallel circuit arrangement of all the reed switches 27, 29, 31, 33 and 35 there will be a normally open circuit condition when the valve is in the fully open condition and the magnet material 13 is adjacent the end of the reed switch 35. If the valve is closed, i.e. the valve stem 5 is moved downwardly by rotation of the handle 7, then the magnetic material 13 will pass the lower reed switch 33 and cause it to trip to the closed condition. Approximately simultaneously, the contacts of reed switch 35 which were previously open when the valve was fully open will now close. The operation of one or other or both of the reed switches 33 and 35 will cause an alarm signal to be provided to show that the valve has moved from the fully open condition towards the closed condition.

It should be observed that the reed switch 33 in this case provides a backup for the reed switch 35 to show that the valve has moved from the fully open position to the closed position. If for example reed switch 35 fails to close due to a failure, then reed switch 33 will provide the necessary backup by the closing of its contacts when the magnetic material 13 is in proximity to the end of the reed switch 33.

All of the reed switches 27, 29, 31, 33 and 35 cooperate together so as to provide protection for the sensor unit 11 so that if a person should maliciously attempt to fool the sensor unit 11 by placing some magnetic material, either ferromagnetic material or some highly magnetic material such as a permanent magnet, near the sensor unit 11, then one or more of the reed switches 27, 29, 31, 33 and 35 will trip and cause an alarm signal to be generated even though the valve has not moved from the open position to the closed position. This, in turn, will cause an alarm signal to be generated. The magnetic material 12 is positioned on the valve stem 5 at a position where it will coincide with reed switch 29 when the valve is in the fully closed position. Thus, an output signal can be provided from the reed switch 29 if it is wired separately from the reed switches 27, 31, 33 and 35, and this can be caused to provide an indication that the valve is in the fully closed condition.

In order to enhance the tamper proof qualities of the sensor unit 11 a microswitch 39 is mounted within the interior 15 so that an arm 41 thereof engages with the undersurface of the lid 19. Typically microswitches have normally open and normally closed contacts. When the lid is in place, the switch 39 is wired so it will provide an open circuit. If the lid 19 is removed then the switch 39 will operate to close its contacts and thus provide an alarm signal. The switch 39 can be wired in parallel with reed switches 27, 31, 33 and 35.

The exact wiring of the reed switches 27, 29, 31, 33 and 35, is a matter of choice depending on the nature of the control circuit to which they are subsequently connected. For example, some control circuits work in a normally closed mode where there is no alarm given and when the switches open an alarm is provided. Accordingly, the reed switches can be appropriately wired to their respective normally opened/normally closed contacts to provide for the required end results. If required individual ones of the reed switches 27, 29, 31, 33 and 35 can be connected to respective circuits so that identification of which particular reed switch has operated can be given. All of these variations are included within the scope of the present invention. In addition, the sensor unit 11 may be fitted into any one of the embodiments disclosed in the aforementioned Petty Patent No. 549,439 (U.S. Pat. No. 4,696,325) and still be within the scope of the present invention.

Referring now to FIGS. 4 through 14 there is shown a different type of valve with sensor unit 11 attached thereto. In this embodiment the valve 43 is a globe valve and is used to supply individual water supply lines in, for example, a fire alarm installation to particular ones of fire sprinklers. Hitherto, valves of this type are normally locked in the open position. Such valves have not previously been provided with magnetic sensors which can tell when the valve is closed.

Referring firstly to FIG. 4 there is shown the sensor unit 11 with a lid 45 (see FIGS. 7 and 9) removed therefrom. The sensor unit 11 comprises a body of bronze material of generally rectangular configuration. The body has a front end 47 and a rear end 49. The front end 47 has a cavity 51 therein in which the valve 43 is placed. The cavity 51 is of generally T shaped section in plan view as shown in FIG. 5 and it has a passageway 53 extending therefrom and through which a handle 55 of the valve 43 can swing. The lid 45 also has a slot 57 therein, through which the handle 55 can swing. The cavity 51 is of sufficient dimensions to enable the valve 43 to neatly fit therein just underneath the lid 45. Circular openings 59 (not clearly shown) are provided in the sides of the sensor unit 11 and enable threaded pipe couplings 61 to be screwed into the female ends of the valve 43. Respective lock nuts 63 are provided on each of the pipe couplings 61 and when screwed up against the sensor unit 11, positively hold the valve 43 and the pipe couplings 61 locked as an integral assembly with the sensor unit 11. Cavity 51 can be considered as two parts—the first part 65 being the head of the T, and the second part 67 being the trunk of the T. The body of the valve is received in the first part 65 and the spindle 79 (not clearly shown) is received in the second part 67.

Three magnetic sensing means in the form of reed switches 69, 71 and 73 are fitted within bores 75 which are disposed in line and directly underneath the path of swinging of the handle 55. The reed switches are held in position within the bores 75 by means of an epoxy backfill (not shown). By referring to FIGS. 10 through 14, it can be seen that the handle 55 is provided with an elongate slot 77 at its forward end which enables it to key onto the spindle 79 of the moving part of the valve 43.

A suitable locking nut 81 holds the handle 55 secured to the spindle 79.

The handle 55 has two bent lugs 83 and 85 at the forward end. These lugs are used to cooperate with a stop 87 moulded integral with the external surface of the body of the valve 43 to provide for positive stopping of the handle 55 at the fully opened and or fully closed positions. Each of the lugs 83 and 85 has suitable magnetic material in the form of respective permanent magnets 89 and 91 fastened thereto on the radially, outermost surfaces thereof.

When the valve is assembled within the sensor unit 11, the magnets 91 and 89 position themselves relative to the reed switches 69, 71 and 73 as shown in FIGS. 12 through 14. Thus, in the valve fully open position, permanent magnet 91 is directly above the central reed switch 71, as shown in FIG. 12. The other magnet 89 is situated remotely from the reed switches 69, 71 and 73 and does not influence operation of any one of those reed switches. In the position shown in FIG. 12, reed switch 71 is biased by the magnet 91 to be in a normally open condition. Reed switches 69 and 73 are interconnected in parallel with reed switch 71 so that the normally open contacts are connected with the normally closed contacts of reed switch 71. Thus, in the position shown in FIG. 12 all the reed switches will have an open circuit in the valve open position. Magnet 91 will not influence reed switches 73 or 69 in this position.

As the valve is closed magnet 91 leaves the proximity of reed switch 71 and approaches the proximity of reed switch 73. Thus, in this condition, reed switch 71 then automatically closes and provides an alarm that the valve is being closed. Simultaneously or approximately so, reed switch 73 trips to the closed position because of the proximity of the magnet 91 thereto, and this also provides for an alarm signal to be given. In this condition, reed switch 73 provides a backup or fail safe procedure for reed switch 71 in the event that it does not close and provide an alarm signal.

When the valve is fully opened as shown in FIG. 14, magnet 89 is in close proximity to reed switch 69 and causes reed switch 69 to close, thereby giving an indication that the valve is fully closed. Accordingly, by wiring of reed switches 71 and 73 in parallel but in opposite states, an appropriate alarm can be given when the valve is moved from the open position to the closed position. By independently wiring reed switch 69 to a separate circuit within the fire installation, a signal can be given that the valve is in the fully closed position. It is observed that each of the reed switches 69, 71 and 73 has three leads therefrom, being respectively, the common lead, the normally open and the normally closed lead. Certain fire installations have control circuitry which causes an alarm signal to be given when a circuit is open. Accordingly, appropriate connection of the states of reed switches 69, 71 and 73 can be made to provide an alarm in these circumstances.

Referring now to FIGS. 4 through 8, it can be seen that there is a further cavity 93 at the front end 47 of the sensor unit 11. This further cavity 93 is a shallow depression in the body of the sensor unit 11 and this further cavity 93 has three reed switches 95, 97 and 99 therein. These reed switches are arranged in a triangular pattern as shown. These reed switches are provided in suitable bores 101 (see FIG. 6) and held in place by a backfill of epoxy resin (not shown). Reed switch 97 is arranged to cooperate with appropriate magnetic material comprising a permanent magnet 103 fitted within a hole 105 provided in an upstanding platform 107 formed on the undersurface of the lid 45. Thus, when the lid 45 is closed, the platform 107 is received within the further cavity 93 and the magnet 103 cooperates with the reed switch 97. In this condition the reed switch 97 is held so that its contacts are open when the lid is in situ. If the lid 45 should be removed the reed switch 47 will trip to the closed condition and an alarm can be given. The other reed switches 95 and 99 are connected in the normally open condition and in parallel with the wiring of reed switch 97. Thus, if a person should attempt to fool the reed switch 97, by placing a magnet or other appropriate magnetic material in proximity thereto, in an attempt to open the lid 45 without causing an alarm to be given, then one or other of the various reed switches 95, 97 and 99 will trip and provide an alarm signal. It is also possible in this condition that one or others of the reed switches 69, 71 and 73 will also trip and provide an alarm condition. The reed switches 95, 97 and 99 can be connected in parallel with the reed switches 71 and 73 if desired.

It should be appreciated here, that a series connection of the reed switches in any embodiment could also be provided if required. The exact wiring configuration of the reed switches is basically immaterial so long as the reed switches 71 and 97 of this embodiment, are connected in one of their states when the magnets which cooperate therewith are in proximity and that the other reed switches are connected in the opposite of their states so that appropriate protection can be provided. The same is true of reed switches 35 and 27, 31 and 33 of the previous embodiment.

The rear end 49 of the sensor unit 11 has a rectangular shaped recess 109 therein. The leads from each of the reed switches can be appropriately wired and terminated therein at a terminal block 111. It should be noted that the recess 109 is closed by a lid 113 and that a microswitch 115 is fitted within the recess 109 so that the arm 117 thereof engages with the lid 113 and is caused to be biased into one of its operative states. Upon removal of the lid 113, the arm 117 can swing and cause the microswitch 115 to trip to the other of its states and thereby provide an alarm signal. The microswitch 115 is appropriately wired into the terminal block 111. Connecting leads 119 pass through a grommet 121 in a side wall of the recess 109 and connect with the terminal block 111.

In order that the valve 43 can be locked in the fully open position, the body of the sensor unit 11 contains a lug 123 with a hole 125 therethrough. The handle 55, in turn, has a further hole 127 therein and a suitable padlock 129 can pass through holes 125 and 127. In order that the sensor unit 11 can be appropriately mounted to a wall or the like, suitable mounting brackets 131 are provided at the rear end 49 (see FIG. 7).

It should be appreciated that two types of lid removal alarm systems have shown in this embodiment. One alarm system comprises the reed switches 95, 97 and 99 and the other comprises the microswitch 115. Either form or both is suitable or mixtures thereof as disclosed. Accordingly the embodiment shown is not to be considered as requiring opposite types of lid removal alarm sensing means.

It should be appreciated that the reed switches 69 and 73 will act to inhibit against persons placing magnetic material against the body of the sensor unit 11 in an attempt to fool reed switch 71 as either of those reed switches 69 or 73 and/or reed switch 71 can trip by the influence of such magnetic fields to provide an alarm.

Figure 15:
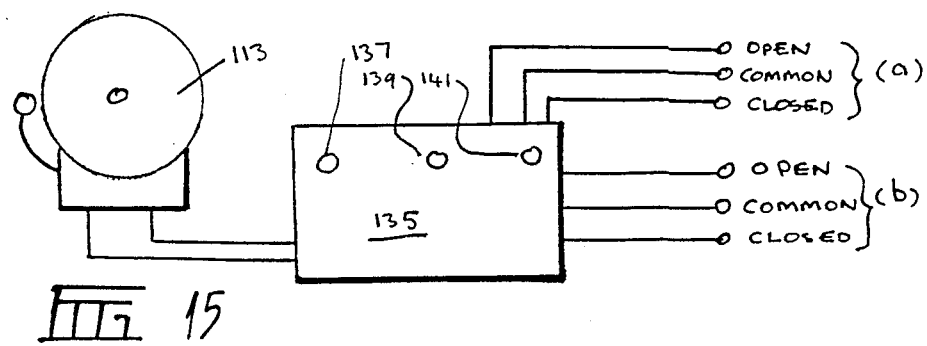
FIG. 15 is a block circuit diagram of the electrical wiring of a typical installation incorporating the valve with magnetic sensors in accordance with a preferred aspect of the present invention.
Figure 9:
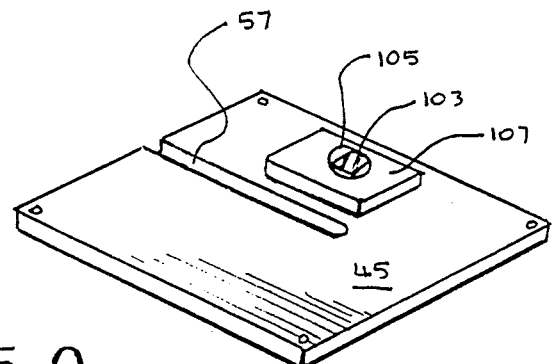
FIG. 9 is an underneath perspective view of the lid of the sensor unit shown in FIGS. 4 through 8.
Figure 10:
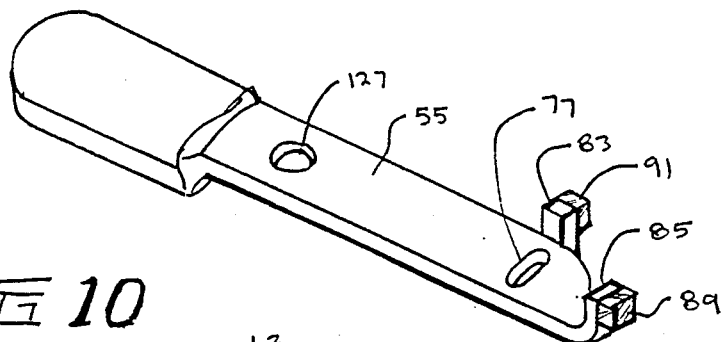
FIG. 10 is a perspective view of the operating handle of the valve shown in FIGS. 4 through 9.
Figure 11:
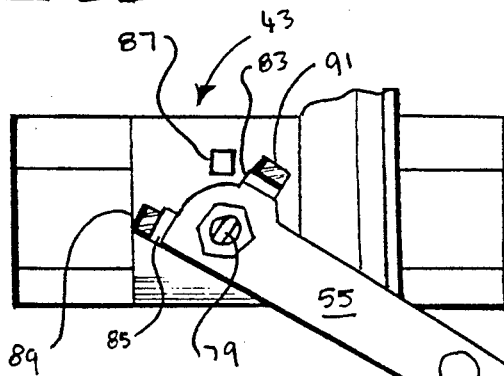
FIG. 11 shows a side view of the valve in the sensor unit shown in FIGS. 4 through 10 and fitted with the handle shown in FIG. 10.

Referring now to FIG. 15 there is shown a block circuit of a typical fire alarm installation comprising an alarm 113 in the form of a bell, a control circuit 135 and lamp alarm means 137, 139 and 141. The control circuit 135 typically has two sets of common and open and closed connections. These are designated A and B respectively. Reed switches 69 or 29 are connected to set A whilst the remaining reed switches and microswitches are connected to set B. In this condition lamp alarm means 137 can show that the valve or valves as the case may be, are open. Lamp alarm means 139 can show that the valves have commenced closing. Simultaneously with illumination of lamp 139 the alarm bell 113 can be activated. When the valve reaches the fully closed position lamp alarm means 141 can be activated. The alarm 113 can continue to be activated in this condition.

Many modifications may be made to the invention as would be apparent to persons skilled in the alarm protection arts. For example any of the modifications previously discussed could be incorporated. Further it is envisaged that by appropriate wiring to a suitable control circuit 135 displays can be provided as to individual valves in a fire installation. It should also be appreciated that land lines or other connections can be made to a local fire authority from the control circuit 135 to give an alarm condition at the fire authority.

It should also be appreciated that the invention is not limited solely to use in the fire protection fields but that is has application in any situation where valves need to be left either open and/or closed and alarm condition given if they are changed from that state.

These and other modifications may be made without departing from the ambit of the invention, the nature of which is to be determined from the foregoing description.

I claim:

1. A device for sensing the open and/or closed position of a valve, comprising:
    (a) a valve for controlling the supply of fluids or other materials, said valve being of the type which is operable to be in a first position in which said valve is in one of a fully open and fully closed position and further operable to be in a second position in which said valve is in another of said fully open and fully closed position and, said valve being in an intermediate position when it is not in either of said first or second position, said valve having a magnetic material part;
    (b) first magnetic sensing means being in a first condition in the presence of a magnetic material and a second condition in the absence of such a magnetic material for sensing said magnetic material part of said valve when said valve is in said first position, said first magnetic sensing means being biased into a non-alarm state when said valve is in said first position, said first magnetic sensing means being biased into an alarm state when said valve is in a position other than said first position;
    (c) second magnetic sensing means being in a condition corresponding to said second condition in the presence of a magnetic material and in a condition corresponding to said first condition in the absence of such a magnetic material positioned immediately adjacent said first magnetic sensing means, for sensing said magnetic material part when said valve is in an intermediate position adjacent said first position, said second magnetic sensing means being biased into a non-alarm state when said valve is in said first position, said second magnetic sensing means being biased into an alarm state as said valve is operated to be in a position other than said first position whereby said second magnetic sensing means can sense the operation of said valve into said first position independently of said first magnetic sensing means and whereby said second magnetic sensing means can sense the presence of a magnetic material, other than said magnetic material part, which would interfere with operation of said first magnetic sensing means.

2. A device as claimed in claim 1, wherein said valve has further magnetic sensing means, positioned adjacent said first magnetic sensing means, which senses said magnetic material in proximity to said first magnetic sensing means, and causes an alarm to be given, when said magnetic material is placed there by a person in an attempt to hold said first magnetic sensing means in a non-alarm condition.

3. A device as claimed in claim 1, wherein said first magnetic sensing means and said second magnetic sensing means are mounted in a housing which is attached to said valve so that the first and second magnetic sensing means operatively co-operate with said magnetic material part which is carried by a valve stem of said valve and wherein said housing is hollow, said first and second magnetic sensing means being electrical switches and wherein electrical connection for the switches is provided within said housing and wherein said housing is closed by a lid, there being lid removal alarm means within said housing which, in use, can be used to provide an alarm signal if said lid is removed.

4. A device as claimed in claim 3, wherein said lid removal alarm means comprises magnetic sensing means which will co-operate with another magnetic material carried by said lid, when said lid is closed.

5. A device as claimed in claim 4, wherein said lid removal alarm means comprises further magnetic sensing means mounted adjacent said magnetic sensing means, said further magnetic sensing means being in a non-alarm state when said lid is closed but positioned relative to said another magnetic material carried by said lid so that if said magnetic material is brought into proximity of said lid in an attempt to fool said magnetic sensing means, if said lid is to be removed, then said further magnetic sensing means will be caused to assume an alarm state.

6. A fluid-controlling valve having a body member, a fluent material controlling member and an actuating member means for causing movement of said fluent material controlling member, including:
a first means, movable through a locus having a length in response to movement of said actuating member means, for altering the ambient magnetic field in a region, having an extent, proximate thereto, said magnetic means being in a first position when said valve is in one of an open and closed state and in a second position when said valve is in another of said open and closed states;
first and second magnetically operable switch means, each having first and second conduction states, for assuming a first conduction state in response to the presence of an ambient magnetic field and a second conduction state in response to a magnetic field different from said ambient magnetic field and wherein said first and second conduction states of said second magnetically operable switch means being opposite to said first and second conduction states of said first magnetically operable switch means;
means for positioning said first and second magnetically operable switch means proximate to said locus of said magnetic means, at adjacent locations which are spaced at a distance less than the length of said locus and greater than said extent,
whereby retention of said first magnetically operable switch means in said second conduction state by an additional magnetic means other than said magnetic means will cause actuation from said first conduction state to said second conduction state of said second magnetically operable switch means.

7. A valve according to claim 6, wherein said first magnetically operable switch means is positioned proximate to an end of said locus and said second switch means being positioned at a distance from said first magnetically operable switch means by a distance slightly greater than said extent
whereby movement of said actuating member means moving said fluent material controlling member away from said first position causes said first magnetically actuable switch means to change from said first conduction state to said second conduction state.

8. A valve according to claim 6, further including a second magnetic means, movable through a second locus having a length in response to movement of said actuating member means, for altering the ambient magnetic field in a region, having an extent, proximate thereto, said second magnetic means being in a third position when said valve is in said one of an open and closed state and in a first position when said valve is in said another of said open and closed states.

9. A valve according to claim 8, further including at least one third magnetically operable switch means having first and second conduction states, for assuming a first conduction state in response to the presence of an ambient magnetic field and a second conduction state in response to a magnetic field different from said ambient magnetic field, and
means for positioning and third magnetically operable switch means proximate to said second locus of said second magnetic means, at adjacent locations which are spaced at a distance less than the length of said locus and greater than said extent.

10. A valve according to claim 8, further including at least one third magnetically operable switch means having first and second conduction states, for assuming a first conduction state in response to the presence of an ambient magnetic field and a second conduction state in response to a magnetic field different from said ambient magnetic field, and
means for positioning said third magnetically operable switch means proximate to an intermediate point of at least one of said first locus and said second locus of said first and second magnetic means, respectively.

11. A valve according to claim 9, further including at least one fourth magnetically operable switch means having first and second conduction states, for assuming a first conduction state in response to the presence of an ambient magnetic field and a second conduction state in response to a magnetic field different from said ambient magnetic field, and means for positioning said fourth magnetically operable switch means proximate to an intermediate point of at least one of said first locus and said second locus of said first and second magnetic means, respectively.

12. A valve according to claim 6, further including alarm means responsive to at least one preselected combination of respective conduction states of said first and said second magnetically operable switch means.

13. A valve according to claim 9, further including alarm means responsive to at least one preselected combination of respective conduction states of at least two of said first, said second and said third magnetically operable switch means.

14. A valve according to claim 11, further including alarm means responsive to at least one preselected combination of respective conduction states of at least two of said first, said second, and third and said fourth magnetically operable switch means.

* * * * *